US006968261B2

(12) United States Patent
Ghoneim et al.

(10) Patent No.: US 6,968,261 B2
(45) Date of Patent: Nov. 22, 2005

(54) METHOD AND APPARATUS FOR VEHICLE STABILITY ENHANCEMENT SYSTEM

(75) Inventors: Youssef Ahmed Ghoneim, Macomb Township, Macomb County, MI (US); Christian Bielaczek, Bad Vilbel (DE); Thomas Jenny, Seeheim-Jugenheim (DE)

(73) Assignee: General Motors Corporation, Detroit, MI (US)

( * ) Notice: Subject to any disclaimer, the term of this patent is extended or adjusted under 35 U.S.C. 154(b) by 115 days.

(21) Appl. No.: 10/336,252

(22) Filed: Jan. 3, 2003

(65) Prior Publication Data

US 2004/0133321 A1 Jul. 8, 2004

(51) Int. Cl.[7] ............................................... G06F 7/00
(52) U.S. Cl. ....................................................... 701/41
(58) Field of Search ............................. 701/41, 42, 70, 701/72, 75, 124; 280/5.502, 5.506, 5.507; 340/967

(56) References Cited

U.S. PATENT DOCUMENTS

| 5,508,921 A | 4/1996 | Chikuma et al. ...... 364/424.05 |
| 5,524,079 A | 6/1996 | Ishida et al. ........... 364/424.05 |
| 5,667,286 A * | 9/1997 | Hoying et al. ............... 303/140 |
| 5,720,533 A | 2/1998 | Pastor et al. ................. 303/147 |
| 5,746,486 A | 5/1998 | Paul et al. .................... 303/146 |
| 6,041,886 A | 3/2000 | Nakaishi et al. ............. 180/444 |
| 6,062,336 A | 5/2000 | Amberkar et al. .......... 180/443 |
| 6,085,860 A | 7/2000 | Hackl et al. ................. 180/443 |
| 6,112,147 A | 8/2000 | Ghoneim et al. ............. 701/80 |
| 6,125,319 A | 9/2000 | Hac et al. ....................... 701/80 |
| 6,161,905 A | 12/2000 | Hac et al. .................... 303/146 |
| 6,169,951 B1 | 1/2001 | Ghoneim et al. ............. 701/70 |
| 6,175,790 B1 | 1/2001 | Lin et al. ....................... 701/36 |
| 6,195,606 B1 | 2/2001 | Barta et al. .................... 701/70 |
| 6,205,391 B1 | 3/2001 | Ghoneim et al. ............. 701/70 |
| 6,591,179 B1 * | 7/2003 | Check et al. .................. 701/91 |

FOREIGN PATENT DOCUMENTS

EP       0 842 841 A1     5/1998    ............ B62D/6/08

OTHER PUBLICATIONS

Furukawa, Yoshimi et al., "A Review of Four–Wheel Steering Studies from the Viewpoint of Vehicle Dynamics and Control", no date.

Whitehead, John C., "Response and Stability of Rear Wheel Steering Vehicles", no date.

* cited by examiner

*Primary Examiner*—Yonel Beaulieu
(74) *Attorney, Agent, or Firm*—Kathryn A. Marra

(57) ABSTRACT

A vehicle stability enhancement (VSE) system for a vehicle having at least one vehicle subsystem includes; at least one sensor for sensing at least one vehicle parameter, at least one vehicle control system for adjusting the at least one vehicle subsystem, at least one memory comprising at least one set of gain factors, and a controller responsive to the at least one sensor and the at least one set of gain factors for controlling the at least one vehicle control system.

28 Claims, 6 Drawing Sheets

METHOD AND APPARATUS FOR VEHICLE STABILITY ENHANCEMENT SYSTEM

TECHNICAL FIELD

This invention relates generally to a vehicle stability enhancement (VSE) system and a method of operation thereof, and more particularly to the incorporation of VSE information into the steering system dynamics.

BACKGROUND

Traditional vehicle chassis subsystems, such as steering, braking and suspension subsystems, are passive, meaning that their responsiveness under operating conditions is determined prior to the vehicle leaving the point of manufacture. In such traditional arrangements, the design of the particular chassis subsystem must be determined up-front and must take into consideration the purpose of the vehicle, such as, for example, whether the vehicle will be used primarily as a cruising vehicle or whether it will be used primarily as a sporty, high performance, vehicle. Steering subsystems with power steering assist may be designed with a greater degree of assistance for cruising vehicles and a lesser degree of assistance for high performance vehicles. By design, such traditional chassis subsystems cannot adapt or actively respond in real time to a change in driving conditions as commanded by the driver.

SUMMARY

In one embodiment, a vehicle stability enhancement (VSE) system for a vehicle having at least one vehicle subsystem is provided, which comprises; at least one sensor for sensing at least one vehicle parameter, at least one vehicle control system for adjusting the at least one vehicle subsystem, at least one memory comprising at least one set of gain factors, and a controller responsive to the at least one sensor and the at least one set of gain factors for controlling the at least one vehicle control system.

In another embodiment, a method for actively controlling a vehicle stability enhancement system in a vehicle having at least one vehicle subsystem is provided, which comprises; sensing at least one vehicle parameter, determining at least one control gain factor in response to the at least one vehicle parameter, determining the state of at least one control flag in response to the actuation of at least one control system, calculating at least one control command in response to the at least one control gain factor and the at least one control flag, and providing tactile actuation of the at least one vehicle subsystem in response to the at least one control command.

BRIEF DESCRIPTION OF THE DRAWINGS

Referring now to the figures, which are exemplary embodiments, and wherein like elements are numbered alike.

DETAILED DESCRIPTION

A detailed description of an embodiment of the present invention is presented herein by way of exemplification and not limitation with reference to FIGS. 1–7.

Vehicle

Figure 1:
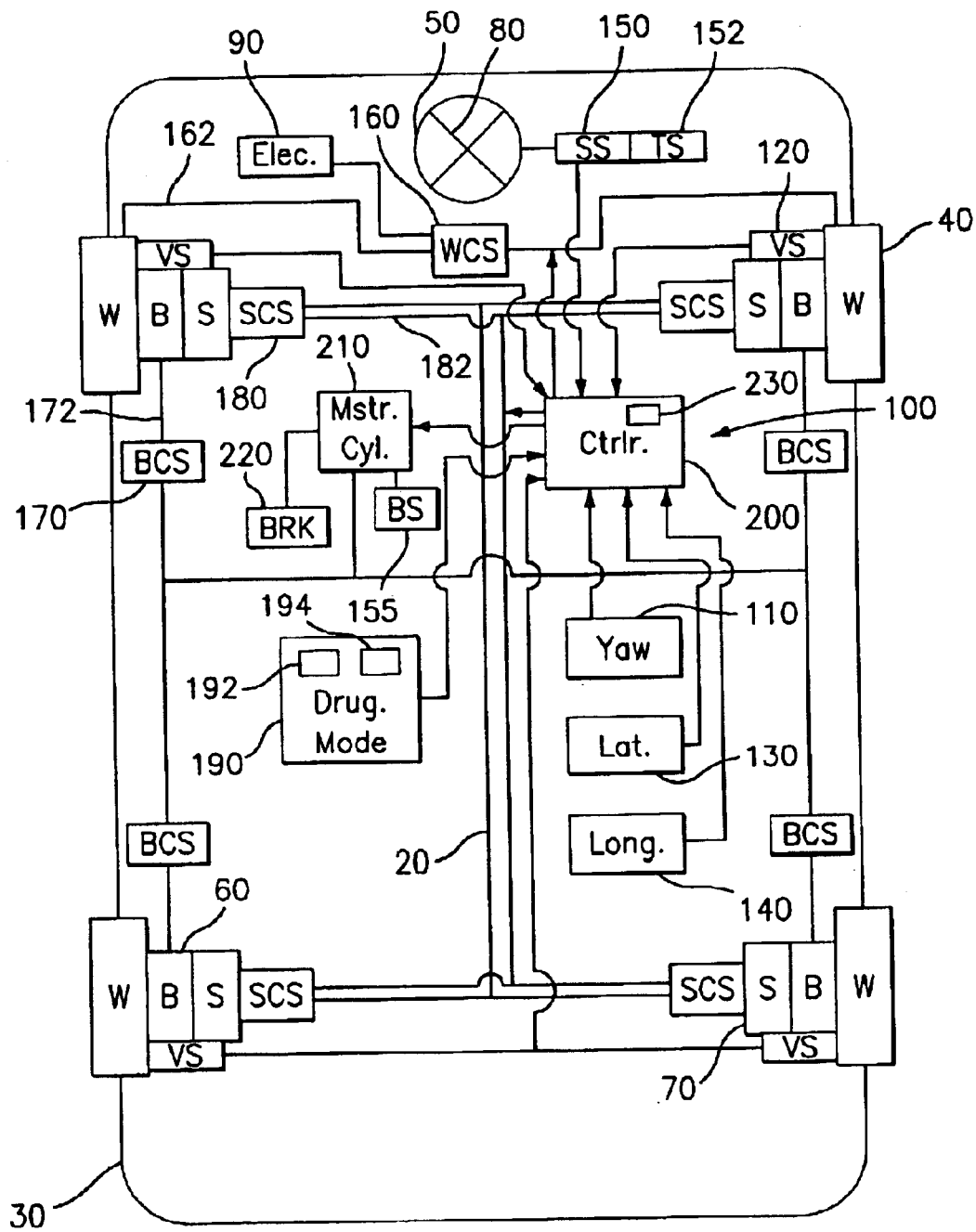
FIG. 1 depicts a generalized schematic of a vehicle operative for implementing the present invention.

FIG. 1 depicts a generalized schematic of a vehicle 10 having a chassis 20, a body 30 arranged on chassis 20, a set of wheels ("W") 40 rotationally coupled to chassis 20, a steering mechanism 50 arranged for steering wheels 40, a braking mechanism ("B") 60 arranged for decelerating wheels 40 upon command, a suspension mechanism ("S") 70 disposed between wheels 40 and chassis 20 for damping vibration at wheels 40, a steering wheel 80 for transferring a driver commanded steering torque to the steering mechanism 50 and for providing the driver with tactile feedback regarding the steering mechanism 50, and an integrated chassis control system (ICCS) 100. Steering mechanism 50, braking mechanism 60, and suspension mechanism 70 are alternatively referred to as vehicle subsystems. The ICCS 100 includes: a yaw rate sensor ("Yaw") 110 for sensing the actual vehicle yaw rate in degrees-per-second; wheel velocity sensors ("VS") 120; a lateral acceleration sensor ("Lat") 130, such as for example an accelerometer, for sensing the absolute value of the vehicle's lateral acceleration in g-force; a longitudinal acceleration sensor 140 ("Long") (e.g., accelerometer) for sensing the absolute value of the vehicle's longitudinal acceleration in g-force; a steering angle sensor ("SS") 150 for sensing the angle of steer for the steering wheels; a steering torque sensor ("TS") 152 for sensing the torque in steering mechanism 50; and a brake pressure sensor ("BS") 155 for sensing the brake fluid pressure. The sensed parameters are herein referred to as vehicle parameters. The ICCS 100 also includes the following vehicle control systems: a steering mechanism control system ("WCS") 160, such as, for example, electronically controlled actuators, electric motors, and dampers, for adjusting the stiffness and damping characteristics of, and the degree of steering assist associated with, the steering mechanism 50; a braking mechanism control system ("BCS") 170 (e.g., electronically controlled actuators, electric motors, and dampers) for adjusting the stiffness and damping characteristics of, and the degree of pressure-apply rate associated with, the braking mechanism 60; and a suspension mechanism control system ("SCS") 180 (e.g., electronically controlled actuators, electric motors, and dampers) for adjusting the stiffness and damping characteristics of the suspension mechanism 70. The ICCS 100 further includes: a driving mode switch ("Drvg Mode") 190 for enabling a driver to selectively choose between multiple driving modes, such as, for example, "Normal" and "Sporty" modes, where the "Normal" mode may be for highway cruising and the "Sporty" mode may be for high performance handling; and a central controller 200 arranged in operable communication with sensors 110, 120, 130, 140, 150, 152, 155, and mechanism control systems 160, 170, 180. Control lines 162, 172, 182, are depicted, for simplicity, as single lines, but represent both signal communication lines and operational links for communicating with and actuating the mechanism control systems 160, 170, 180, respectively. Driving mode switch 190 may include a pushbutton type switch 192, or any other type of switch suitable for producing a driving mode request signal, and a display 194 for providing feedback to the driver regarding the driving mode setting. BCS 170 is in operable communication with controller 200 via brake master cylinder ("Mstr Cyl") 210. "Mstr Cyl" 210 is also in operable communication with brake pedal ("Brk") 220. Braking mechanism 60 may be operated by the driver via brake pedal 220 and master cylinder 210, or by controller 200 via the ICCS 100, master cylinder 210, and brake mechanism control system 170. Brake pressure sensor 155 senses the brake fluid pressure in brake master cylinder 210. It will be appreciated that while BCS 170 is depicted in the schematic of FIG. 1 as being located between master cylinder 210 and each braking mechanism 60, it may also be located between controller 200 and master cylinder 210, depending on whether individual or concurrent wheel braking is desired. Controller 200 includes a memory 230 for storing sensor information, register information and settings, discussed below, and look-up tables of gain factors, also discussed below. The vehicle electrical system 90 provides electrical power to all of the vehicle's electrically operated systems, including the controller 200 and the mechanism control systems 160, 170, 180.

It will also be appreciated that while the disclosed embodiment refers to only one steering mechanism control system 160, the disclosed "WCS" 160 is intended to include both a steering torque assist ("STA") arrangement, as herein disclosed, in combination with a traditional non-power steering arrangement, and a "STA" arrangement in combination with a conventional power steering arrangement. It will further be appreciated that while the disclosed embodiment refers to a vehicle, such as an automobile, having four wheels, the invention described herein is applicable to any vehicle with any number of wheels.

Alternative vehicles to the disclosed embodiment may be, for example and without limitation, a three-wheel or six-wheel off-road vehicle, designed with normal, sporty, and hill climbing driving modes, and with or without power steering.

Figure 2:
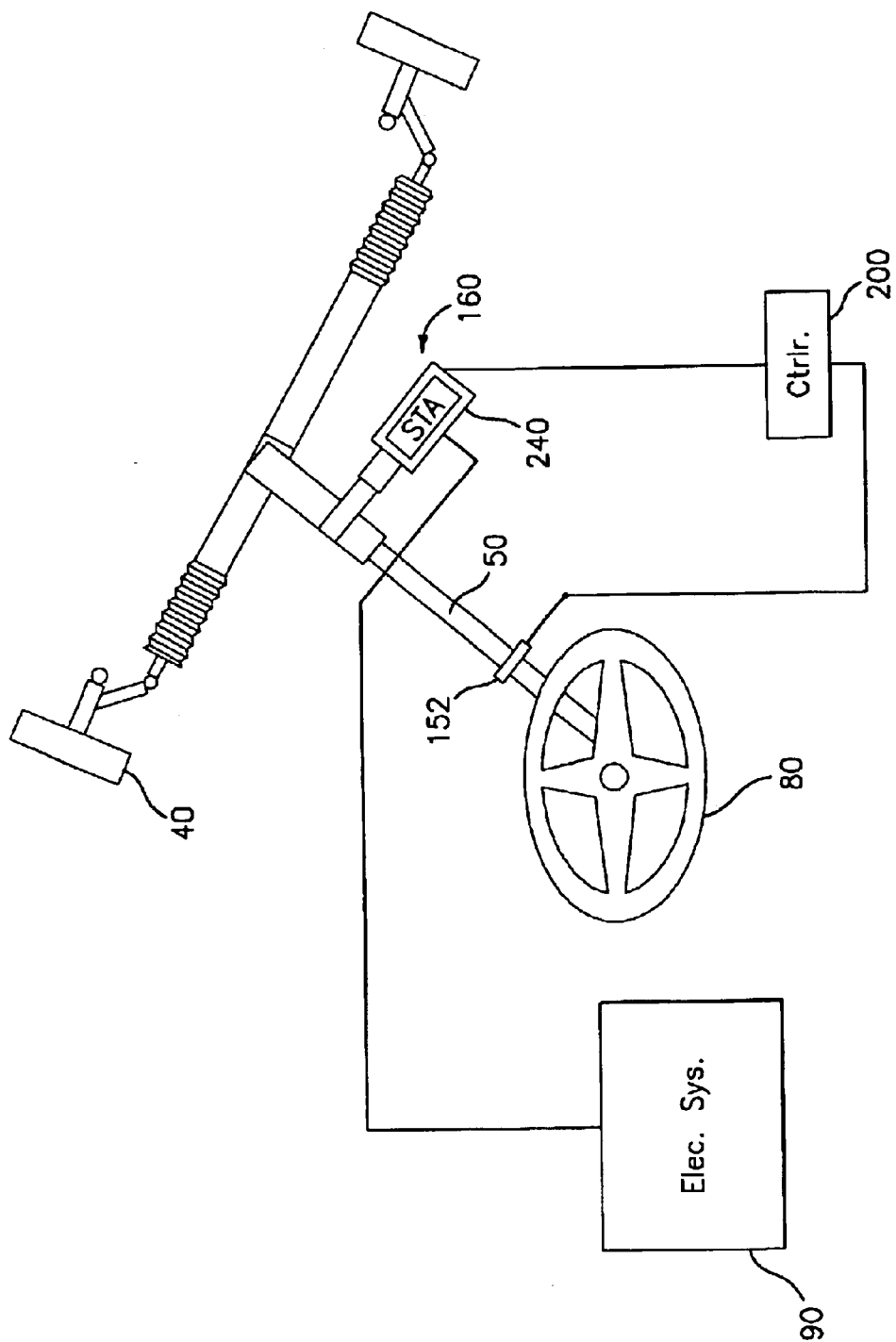
FIG. 2 depicts a generalized schematic of a vehicle subsystem operative for implementing the present invention.

Referring now to FIG. 2, a generalized schematic of steering mechanism 50 and steering mechanism control system 160 with STA actuator 240 is depicted. Steering mechanism control system 160 may also include a conventional power steering arrangement as discussed above. However, for simplicity, such an arrangement is not depicted. Electrical system 90 provides electrical power to STA actuator 240, which may be, for example, an electric motor, and controller 200. Steering torque sensor 152 senses the torque in steering mechanism 50, the torque being delivered to steering mechanism 50 by an operator exerting a torque on steering wheel 80, and sends a torque signal to controller 200. Controller 200 calculates a control command, which will be discussed below, for STA actuator 240, which results in actuation of STA actuator 240 and provides tactile feedback to the operator regarding the steering behavior. The torque provided by STA actuator 240 is referred to as a "steering torque assist" ("STA") and is intended to influence the steering behavior of the operator of the vehicle.

Nomenclature

The nomenclature used herein for implementing the present invention includes the following variables:

$V_x$=vehicle speed (kilometers-per-hour, kph);
δ=steering angle;
L=vehicle wheel base;
$K_u$=understeer coefficient;
fn=frequency coefficient, for example, 2 Hertz;
ζ=damping coefficient, for example, 0.707;
P_term=proportional term used in proportional-derivative control theory;
D_term=derivative term used in proportional-derivative control theory;
Kp=proportional gain factor from, for example, look-up Table 1, (Newton*meters/deg/sec);
Kd=derivative gain factor from, for example, look-up Table 1, (Newton*meters/deg/sec$^2$);
Ycommand=yaw rate command based on driver input, (deg/sec);
Yaw=vehicle actual yaw rate, (degrees-per-second, deg/sec));
T=control sampling time interval, for example, 10-milliseconds (msec);
k=control sampling time;
Ye=vehicle yaw rate error, (deg/sec);
Ye(k)=vehicle yaw rate error at time step k;
Ye_est=estimated vehicle yaw rate error;
Ye_est(k)=estimated vehicle yaw rate error at time step k;
Ye_est(k−1)=estimated vehicle yaw rate error at prior time step (k−1);
VSE_WFlag=VSE wheel flag (control flag), where VSE_WFlag is (+1) for right front and right rear wheels experiencing a braking condition under VSE system control, and (−1) for left front and left rear wheels experiencing a braking condition under VSE system control;
STA_FB=steering torque assist feedback torque, (Newton*meters), (N*m);
STA_FF=steering torque assist feedforward torque from, for example, FIG. 6 graph, (N*m); and
STorque=steering torque from steering torque sensor, (N*m).

Yaw rate command (Ycommand) may be calculated as described in commonly assigned U.S. Pat. No. 5,746,486, entitled "Brake Control System", filed Aug. 29, 1997, which is incorporated herein by reference in its entirety, or it may be calculated according to the following equation:

$$Y\text{command}=V_x*\delta/(L+K_u*V_x^2). \qquad \text{Equa. 1.}$$

The following variables are calculated terms:

$$Ye=Y\text{command}-Yaw; \qquad \text{Equa. 2.}$$

$$Ye(k)=Y\text{command}(k)-Yaw(k); \qquad \text{Equa. 3.}$$

$$g1=2*\zeta*(2*\pi*fn); \qquad \text{Equa. 4.}$$

$$g2=(2*\pi*fn)^2; \qquad \text{Equa. 5.}$$

$$Ye\_est(k)=(1-T*g1)*Ye\_est(k-1)+T*g1*Ye(k)+T*Ye\_est'(k); \qquad \text{Equa. 6.}$$

$$Ye\_est'(k)=Ye\_est'(k-1)+T*g2*(Ye(k)-Ye\_est(k)); \qquad \text{Equa. 7.}$$

$$P\_term=Ye(k)*Kp; \qquad \text{Equa. 8.}$$

$$D\_term=Ye\_est'(k)*Kd; \qquad \text{Equa. 9.}$$

$$STA\_FB=VSE\_W\text{Flag}*|(P\_term+D\_term)|; \text{ and} \qquad \text{Equa. 10.}$$

$$T\text{assist}=STA\_FF+STA\_FB. \qquad \text{Equa. 11.}$$

Quotations (" ") surrounding a variable designation used herein represents a register in memory 230 containing the value of the respective variable, "| |" designates an "absolute value" operator, and a single quotation (') following a variable designates a "derivative" operator. A variable name presented in an equation represents a valve associated with the respective variable, and a variable name presented in a process represents a command having a command signal associated with a related valve stored in a register in memory 230.

Controller

Controller 200 is a microprocessor based control system adapted for actively controlling an integrated set of chassis subsytems, and more particularly, for actively providing a steering torque assist to steering mechanism 50 in accordance with control logic described herein. Controller 200 typically includes a microprocessor, ROM and RAM, and appropriate input and output circuits of a known type for receiving the various input signals and for outputting the various control commands to the various actuators and control systems. The control logic implemented by controller 200 is cycled at a control sampling rate of T, and is best seen by referring to FIGS. 3–6.

Figure 3:
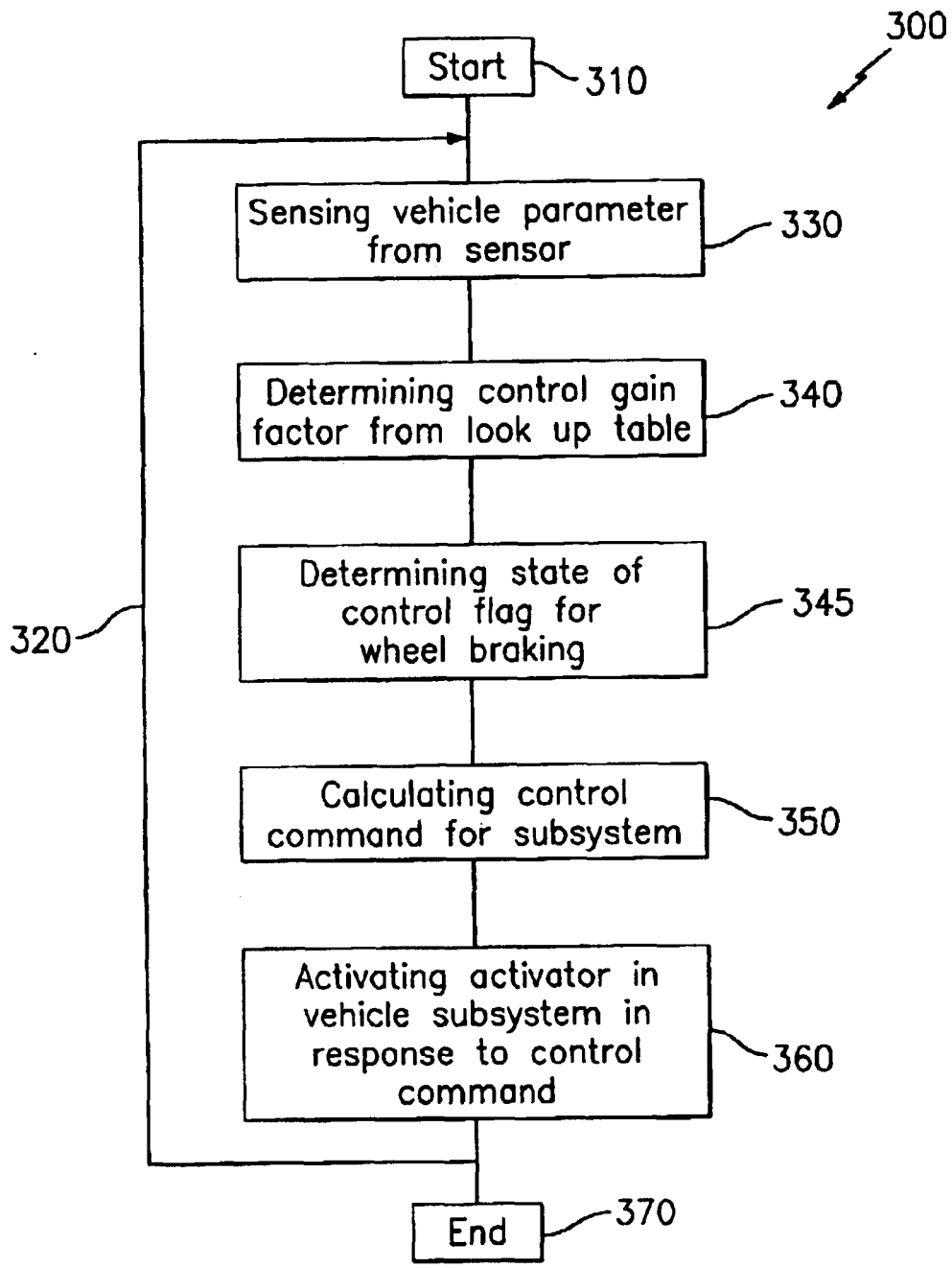
FIG. 3 depicts a generalized flowchart for implementing the present invention.

Referring to FIG. 3, a generalized flowchart 300 for implementing the present invention begins at start 310, which includes an initialization procedure that resets all of the system flags, registers and timers. Control logic then enters control loop 320, which includes the steps of; sensing 330 vehicle parameters from the various sensors discussed above (and more particularly sensing the vehicle speed, the steering angle, the yaw rate, the steering torque, and the wheel flag), determining 340 control gain factors from look-up Table 1 (discussed below), determining 345 the state of the VSE wheel flag (discussed below), calculating 350 a control command for steering mechanism control system 160, and actuating 360 STA actuator 240 in steering mechanism control system 160 for providing tactile feedback to the operator through steering mechanism 50 and steering wheel 80 regarding the steering behavior. One pass through control loop 320 is completed for each sampling interval T. Process 300 ends 370 when controller 200 interrupts the process or electrical system 90 powers down.

Step 340 involves the determination of control gain factors Kp and Kd from look-up Table 1 below, which uses vehicle speed as an input. The values provided in Table 1 are meant for exemplary purposes only, and may be changed for design reasons, such as, for example, the design of the vehicle, the intended use of the vehicle, and the desired operating characteristics of the vehicle. Vehicle speeds between or beyond those provided in Table 1 may be interpolated or extrapolated from the values provided.

TABLE 1

| | Vehicle Speed (kph) | | | | |
|---|---|---|---|---|---|
| | 0 | 50 | 100 | 150 | 200 |
| Kp | 0.09 | 0.09 | 0.06 | 0.045 | 0.03 |
| Kd | 0.0036 | 0.0036 | 0.0036 | 0.0018 | 0.0018 |

Step 350 involves the calculation of a control command, hereinafter referred to as a steering torque assist (STA) command, represented by variable (Tassist), which is best seen by now referring to FIG. 4.

Figure 4:
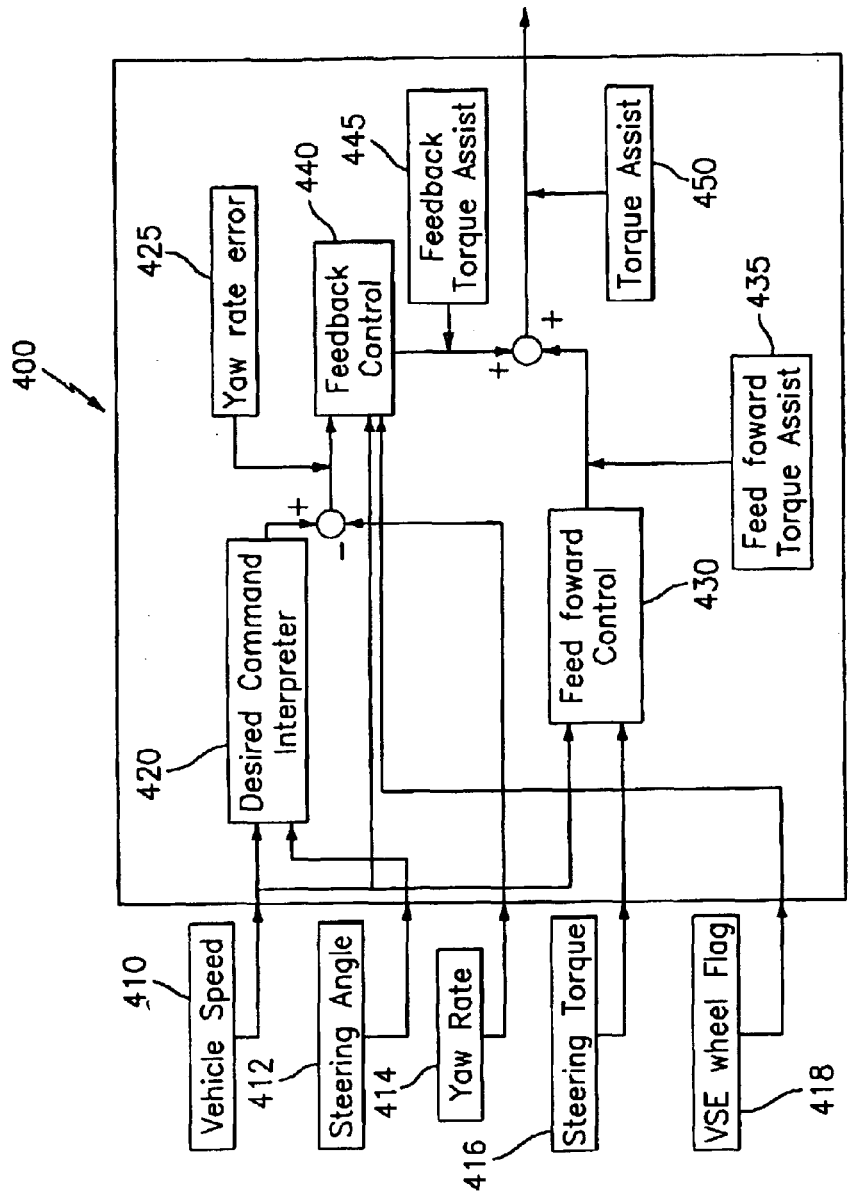
FIG. 4 depicts a block diagram of a control system for implementing the present invention.

In FIG. 4, a block diagram 400 of a control system for controlling the steering torque assist is depicted, which shows the following inputs; vehicle speed 410, steering angle 412, yaw rate 414, steering torque 416, and VSE wheel flag 418 (VSE_WFlag). The first four inputs are provided by velocity sensor 120, steering angle sensor 150, yaw rate sensor 110, and steering torque sensor 152. The last input, VSE wheel flag 418, is provided by controller 200 in response to the vehicle 10 operating in a VSE mode.

The vehicle of the present invention is considered to be operating in a VSE mode when braking mechanism control system 170 is responding to the VSE system. A brake control system similar to WCS 170 is described in commonly assigned U.S. Pat. No. 5,746,486, entitled "Brake Control System" filed Aug. 29, 1997 (the '486 patent). Braking mechanism control system 170 is considered to be responding to the VSE system when it is operating in a manner similar to an active brake control system as described in the '486 patent, which is herein generally described as the braking mechanism 60 responding to the controller 200. Since controller 200 controls the action of braking mechanism 60, controller 200 has information regarding a particular wheel 40 under a VSE system brake command. In the present invention, and as discussed above, the sign of VSE_WFlag is positive for right side wheels under a VSE brake command and negative for left side wheels under a VSE brake command, which may be determined by controller 200 and the operation of BCS 170.

Referring back to FIG. 4, block 420 responds to vehicle speed ($V_x$), block 410, and steering angle ($\delta$), block 412, to calculate a yaw command (Ycommand) according to Equation 1 above. The output of block 420 is the yaw command (Ycommand). Block 430 responds to vehicle speed ($V_x$), block 410, and steering torque (STorque), block 416, to calculate a feed forward steering torque assist (STA_FF), block 435, according to the graph of FIG. 6.

Figure 6:
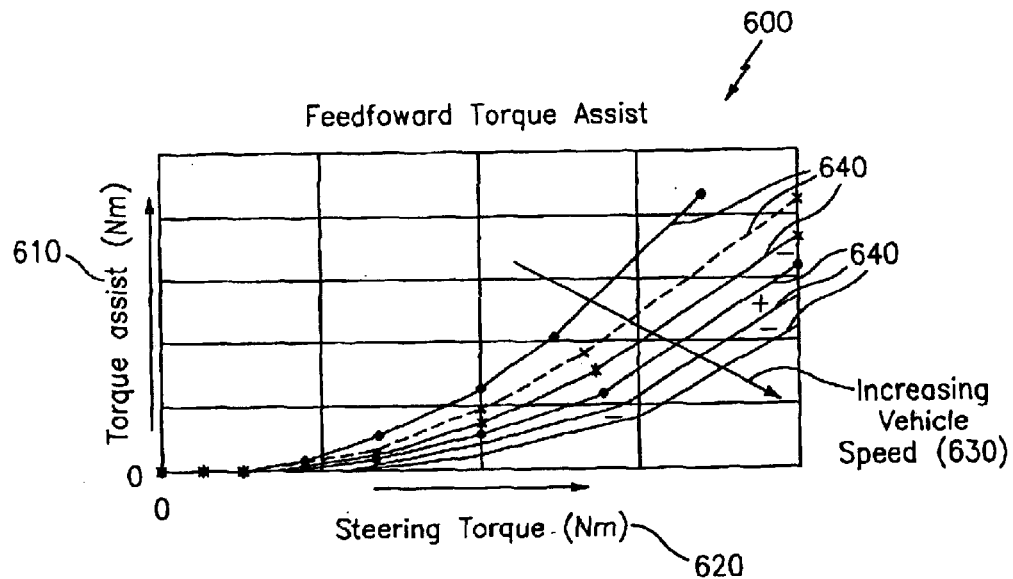
FIG. 6 depicts a graphical example of the relationship between a control command and vehicle parameters in accordance with the present invention.

Referring now to FIG. 6, a graph 600 of the feed forward steering torque assist (STA_FF), block 610, as a function of the steering torque (STorque), block 620, and vehicle velocity ($V_x$), block 630, is provided. While FIG. 6 is discussed in association with the present invention, it is provided for exemplary purposes only, and it is understood that the graphical representation of output to input may be varied according to alternative design considerations. In the present invention, the sign of the feedforward steering assist (STA_FF) is positive for a right hand turn, and negative for a left hand turn, which may be sensed by steering angle sensor 150. The control logic of controller 200 enters the graph of FIG. 6 with information relating to the steering torque, block 620, and the vehicle velocity, block 630, and exists the graph of FIG. 6 with information relating the the feed forward steering torque assist, block 610. The information contained within the graph of FIG. 6 may be stored in a look-up table in memory 230, or may be calculated from an equation. If a look-up table scheme is employed, as in the present invention, controller 200 may interpolate between or extrapolate beyond tabulated discrete data points. As can be seen from the graph of FIG. 6, the feed forward steering torque assist, block 610, increases in magnitude as the steering torque, block 620, increases, and decreases in magnitude as vehicle speed, block 630, increases. Each line of the plurality of graphed lines 640, represents a graphical relationship between steering torque, block 620, and feed forward steering torque assist, block 610, at a given velocity, block 630.

Referring now back to FIG. 4, the output of block 430 is the feed forward steering torque assist (STA_FF), block 435. Block 440 responds to the yaw rate error (Ye), block 425 (which is the output (Ycommand) of block 420 minus the yaw rate (Yaw), block 414), the vehicle velocity ($V_x$), block 410, and VSE_WFlag, block 418 (discussed above). The output of block 440 is the feedback steering torque assist (STA_FB), block 445, which is calculated in accordance with Equation 10 above. The output (STA_FF) of block 430 is added to the output (STA_FB) of block 440, in accordance with Equation 11 above, to provide an output (Tassist) of flowchart 400, designated by block 450. The steering torque assist signal (Tassist), block 450, provides the control signal (command) to STA actuator 240 for providing tactile feedback to the operator regarding the steering behavior.

Figure 5:
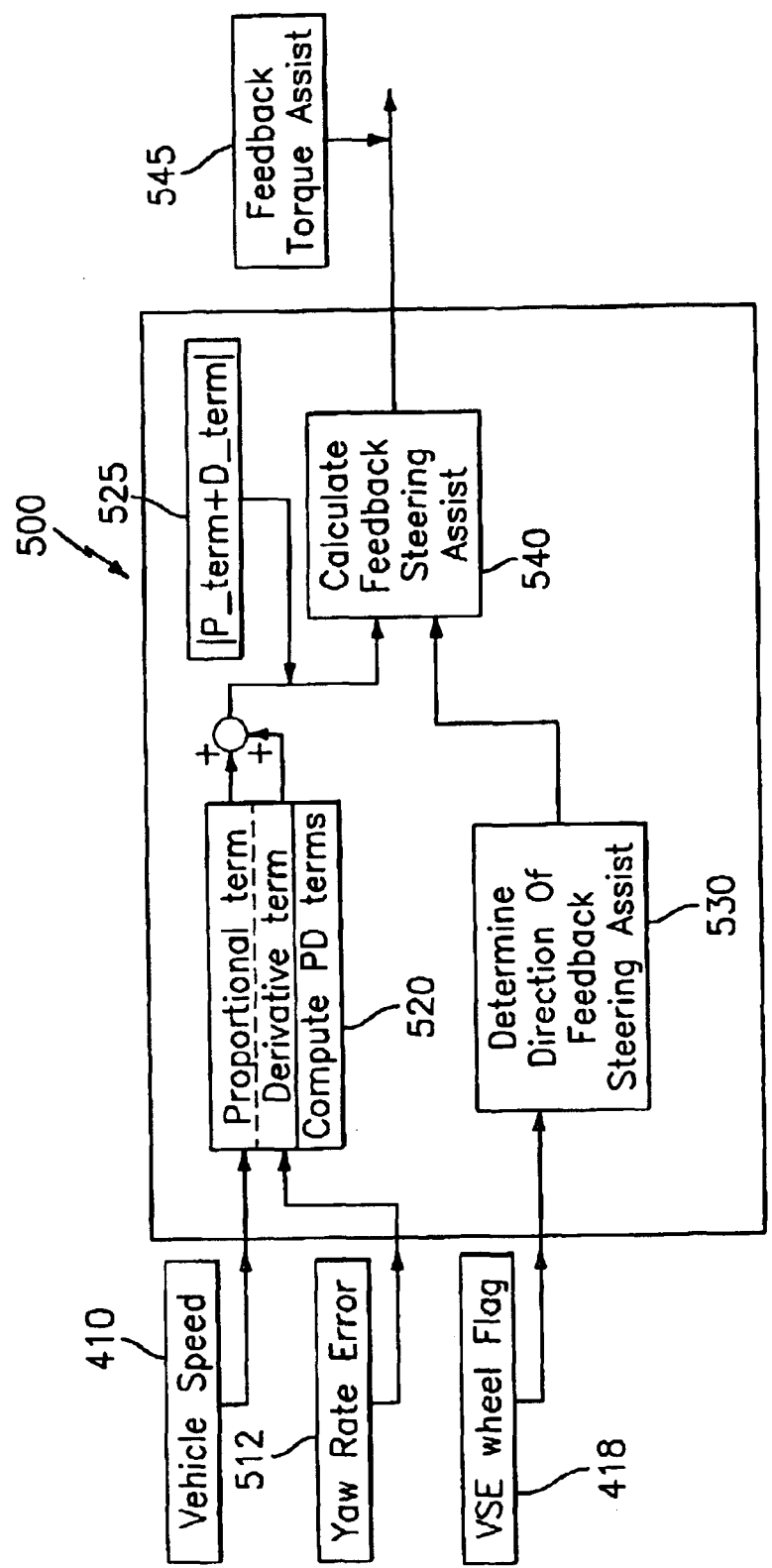
FIG. 5 depicts a block diagram of a feedback control system for implementing the present invention.

FIG. 5 depicts an expanded block diagram 500 of the process represented by block 440 in block diagram 400. Referring to FIG. 5, block 520 responds to vehicle speed ($V_x$), block 410, and yaw rate error (Ye), block 512, to calculate the proportional and derivative terms (P_term) and (D_term) in accodance with Equations 8 and 9, and Table 1, above. The absolute value of the (P_term) added to the (D_term) results in an integrated output represented by block 525. Block 530 responds to the input VSE_WFlag, represented by block 418. The state of VSE_WFlag is determined by controller 200 monitoring the activity of the VSE system, as discussed above in relation to the '486 patent. The output of block 530 determines the direction of feedback, positive or negative, for the feedback steering torque assist (STA_FB). The output of block 530 and the integrated output represented by block 525 are then multiplied together at block 540 in accordance with Equation 10 above, resulting in feedback steering torque assist (STA_FB) represented by block 545.

It will be appreciated that the block diagrams of FIGS. 4 and 5 represent both the calculation of various control commands, as represented by the labeled blocks, and the communication of various control command signals, as represented by the connecting single lines.

VSE_WFlag and Vehicle Behavior Generally

Figure 7:
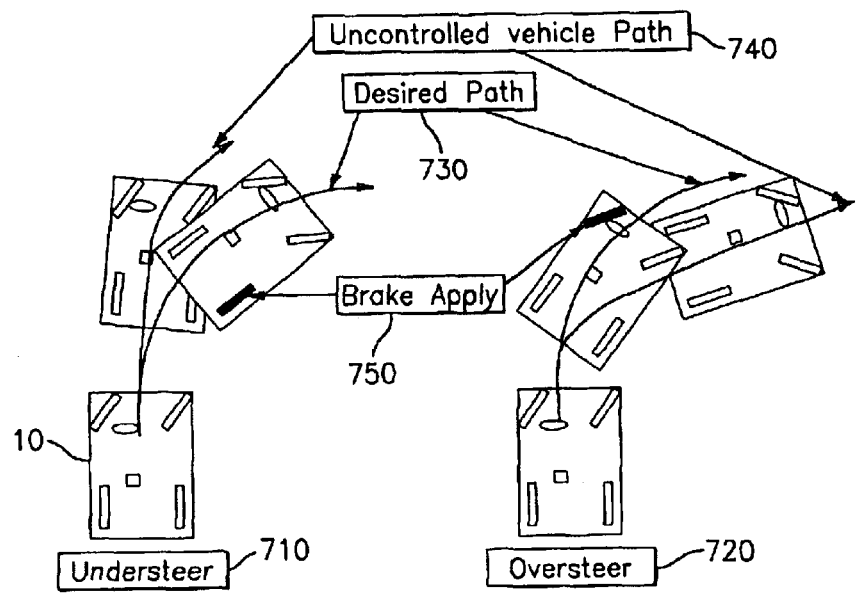
FIG. 7 depicts a generalized diagram of a vehicle responsive to the present invention.

The positive and negative signs of VSE_WFlag and STA_FF are best understood by referring now to FIG. 7, which depicts a generalized diagram 700 of vehicle 10 responsive to understeer, block 710, and oversteer, block 720, conditions, with the VSE system active, block 730, and inactive, block 740.

Regarding the understeer, block 710, condition, and in accordance with the above discussion, the sign of STA_FF is positive (right hand turn), and the sign of VSE_WFlag is positive (right side braking wheel active). In a right hand turn understeer condition, the VSE system activates the right rear brake, block 750, thereby setting the VSE_WFlag to (+1).

Regarding the understeer, block 720, condition, and in accordance with the above discussion, the sign of STA_FF is positive (right hand turn), and the sign of VSE_WFlag is negative (left side braking wheel active). In a right hand turn oversteer condition, the VSE system activates the left front brake, block 750, thereby setting the VSE_WFlag to (−1).

Through active intervention of the VSE system and in accordance with the invention described herein, not only will controller 200 provide braking assistance to correct the vehicle's path, but controller 200 will also provide steering assistance through tactile feedback to the driver, thereby influencing the driver to adjust the steering to correct the vehicle's path.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle stability enhancement system for a vehicle having at least one vehicle subsystem, comprising:
   at least one sensor for sensing at least one vehicle parameter;
   at least one vehicle control system for adjusting the at least one vehicle subsystem, said at least one vehicle control system comprising a steering control system;
   at least one memory comprising at least one set of gain factors; and
   a controller responsive to said at least one sensor and said at least one set of gain factors for controlling said at least one vehicle control system, including said steering control system.

2. The vehicle stability enhancement system of claim 1, wherein said at least one sensor comprises:
   a yaw sensor for sensing the vehicle yaw rate;
   at least one velocity sensor for sensing the velocity of the vehicle;
   a steering angle sensor for sensing the vehicle steering angle;
   a steering torque sensor for sensing the torque in the vehicle steering mechanism; and
   at least one sensor signal; wherein
   said at least one sensor signal is received at said controller.

3. The vehicle stability enhancement system of claim 2, wherein said at least one vehicle control system comprises at least one brake control system; and further comprising:
   a wheel control flag for indicating the state of said at least one brake control system responsive to a controlled braking condition.

4. The vehicle stability enhancement system of claim 3, wherein:
   said wheel control flag is positive for right side wheels and negative or left side wheels.

5. The vehicle stability enhancement system of claim 4, wherein said steering control system comprises:
   an actuator responsive to said at least one sensor signal and said wheel control flag.

6. The vehicle stability enhancement system of claim 5, wherein said actuator comprises:
   an electric motor.

7. The vehicle stability enhancement system of claim 1, wherein said at least one set of gain factors comprises:
   a proportional gain factor and a derivative gain factor responsive to the speed of the vehicle.

8. The vehicle stability enhancement system of claim 7, further comprising:
   a first steering torque assist command responsive to at least one vehicle parameter; and
   a second steering torque assist command responsive to at least two vehicle parameters and said wheel control flag.

9. The vehicle stability enhancement system of claim 8, further comprising:
   a torque assist command responsive to said first and said second steering torque assist commands.

10. The vehicle stability enhancement system of claim 8, wherein:
    said first steering torque assist command responsive to at least one vehicle parameter comprises a feed forward steering torque assist command responsive to the velocity of the vehicle and the torque in the vehicle steering mechanism; and
    a second steering torque assist command responsive to at least two vehicle parameters and said wheel control flag comprises a feedback steering torque assist command responsive to the velocity of the vehicle, the vehicle steering angle, the vehicle yaw rate, and said wheel control flag.

11. The vehicle stability enhancement system of claim 9, wherein the value of said torque assist command is positive for actuating said actuator in first direction and negative for actuating said actuator in a second direction.

12. The vehicle stability enhancement system of claim 9, wherein:
the value of said torque assist command increases as the torque in the steering mechanism increases, and wherein;
the value of said torque assist command decreases as the velocity of the vehicle increases.

13. A method for actively controlling a vehicle stability enhancement system in a vehicle having at least one vehicle subsystem, comprising:
sensing at least one vehicle parameter;
determining at least one control gain factor in response to the at least one vehicle parameter;
determining the state of at least one control flag in response to the actuation of at least one control system;
calculating at least one control command in response to the at least one control gain factor and the at least one control flag; and
providing tactile actuation of the at least one vehicle subsystem in response to the at least one control command.

14. The method of controlling set forth in claim 13, wherein said providing tactile actuation of the at least one vehicle subsystem further comprises:
providing tactile actuation of a vehicle steering mechanism.

15. The method of controlling set forth in claim 14, wherein said sensing at least one vehicle parameter further comprises:
sensing the vehicle yaw rate;
sensing the vehicle velocity;
sensing the vehicle steering angle; and
sensing the torque in the vehicle steering mechanism.

16. The method of controlling set forth in claim 15, wherein said determining the state of at least one control flag further comprises:
determining the state of a vehicle stability enhancement wheel flag responsive to a vehicle stability enhancement wheel braking condition.

17. The method of controlling set forth in claim 14, wherein said determining at least one control gain factor further comprises:
determining a proportional gain factor and a derivative gain factor responsive to the at least one vehicle parameter.

18. The method of controlling set forth in claim 17, wherein said determining a proportional gain factor and a derivative gain factor further comprises:
accessing a look up table for determining the proportional gain factor and the derivative gain factor, wherein the proportional gain factor and the derivative gain factor are responsive to the vehicle velocity.

19. The method of controlling set forth in claim 16, wherein said calculating at least one control command further comprises:
calculating a first steering torque assist command responsive to at least one vehicle parameter;
calculating a second steering torque assist command responsive to at least two vehicle parameters and the state of the vehicle stability enhancement wheel flag; and
calculating a torque assist command responsive to the first and second steering torque assist commands.

20. The method of controlling set forth in claim 19, wherein:
said calculating a first steering torque assist command responsive to at least one vehicle parameter comprises calculating a feed forward steering torque assist command responsive to the vehicle velocity and the torque in the vehicle steering mechanism; and
calculating a second steering torque assist command responsive to at least two vehicle parameters and the state of the vehicle stability enhancement wheel flag comprises calculating a feedback steering torque assist command responsive to the vehicle velocity, the vehicle steering angle, the vehicle yaw rate, and the state of the vehicle stability enhancement wheel flag.

21. The method of controlling set forth in claim 19, wherein said providing tactile actuation of a vehicle steering mechanism further comprises:
actuating an actuator in a first direction in response to a positive torque assist command and in a second direction in response to a negative torque assist command.

22. The method of controlling set forth in claim 21, wherein said actuating an actuator further comprises:
actuating an electric motor.

23. The vehicle stability enhancement system of claim 3, wherein:
said wheel control flag is indicative of a braking condition of at least one of the right side front and rear wheels, and the left side front and rear wheels.

24. The method of controlling set forth in claim 16, wherein:
said wheel control flag is indicative of a braking condition of at least one of the right side front and rear wheels, and the left side front and rear wheels.

25. The vehicle stability enhancement system of claim 8, wherein:
said first steering torque assist command is integrated with said second steering torque assist command thereby providing a steering torque assist signal that controls said actuator.

26. The vehicle stability enhancement system of claim 1, further comprising:
a wheel control flag indicative of a wheel under a braking condition;
wherein said steering control system comprises a steering assist actuator responsive to said wheel control flag.

27. The vehicle stability enhancement system of claim 1, wherein:
said steering control system comprises a steering assist actuator having tactile feedback capability directed to an operator of the vehicle.

28. The vehicle stability enhancement system of claim 20, wherein:
said vehicle is set to operate in a vehicle stability enhancement mode.

* * * * *